United States Patent
Tsuchizawa et al.

(10) Patent No.: US 11,840,311 B2
(45) Date of Patent: Dec. 12, 2023

(54) HUMAN-POWERED VEHICLE CONTROL DEVICE, SUSPENSION SYSTEM, AND HUMAN-POWERED VEHICLE

(71) Applicant: Shimano Inc., Osaka (JP)

(72) Inventors: Yasuhiro Tsuchizawa, Osaka (JP); Nobukatsu Hara, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/966,583

(22) Filed: Oct. 14, 2022

(65) Prior Publication Data

US 2023/0034689 A1 Feb. 2, 2023

Related U.S. Application Data

(63) Continuation of application No. 16/257,928, filed on Jan. 25, 2019, now Pat. No. 11,498,641.

(30) Foreign Application Priority Data

Feb. 20, 2018 (JP) ................. 2018-027934

(51) Int. Cl.
*B62M 6/45* (2010.01)
*B62K 25/28* (2006.01)
(Continued)

(52) U.S. Cl.
CPC ............. *B62M 6/45* (2013.01); *B62J 45/411* (2020.02); *B62J 45/413* (2020.02); *B62J 45/421* (2020.02); *B62K 25/286* (2013.01); *B60W 10/22* (2013.01); *B60W 40/10* (2013.01); *B60W 2300/36* (2013.01); *B62K 2025/044* (2013.01); *F16F 9/14* (2013.01)

(58) Field of Classification Search
CPC ... B62K 25/286; B62K 2025/044; F61F 9/14; B62M 6/45; B62J 45/413; B62J 45/421; B62J 45/411; B60W 10/22; B60W 2300/36; B60W 40/10
See application file for complete search history.

(56) References Cited

U.S. PATENT DOCUMENTS 6,149,174 A  11/2000  Bohn
8,286,982 B2  10/2012  Plantet et al.
(Continued)

FOREIGN PATENT DOCUMENTS

CN  107128428 A  9/2017
CN  107685824 A  2/2018
(Continued)

*Primary Examiner* — Tony H Winner
(74) *Attorney, Agent, or Firm* — Global IP Counselors, LLP

(57) ABSTRACT

A control system for a human-powered vehicle includes a suspension device, at least one detector, an electronic controller. The suspension device includes a first suspension and a second suspension. The at least one detector is configured to detect information related to at least two conditions of the human-powered vehicle. The conditions include an operating state of the suspension device, a power input to the human-powered vehicle, a torque of a power transmission component, and a rotating state of the power transmission component. The electronic controller is configured to selectively control the suspension device between a first operating state and a second operating state in accordance with a detection result obtained by the at least one detector.

13 Claims, 7 Drawing Sheets

(51) Int. Cl.
*B62J 45/411* (2020.01)
*B62J 45/413* (2020.01)
*B62J 45/421* (2020.01)
*F16F 9/14* (2006.01)
*B62K 25/04* (2006.01)
*B60W 40/10* (2012.01)
*B60W 10/22* (2006.01)

(56) References Cited

U.S. PATENT DOCUMENTS

| | | |
|---|---|---|
| 8,429,061 B2 | 4/2013 | Shirai |
| 9,199,690 B2 | 12/2015 | Watarai |
| 10,227,106 B2 | 3/2019 | Tsuchizawa et al. |
| 10,906,607 B2 | 2/2021 | Ichida et al. |
| 11,124,267 B2 | 9/2021 | Shahana |
| 2016/0368559 A1 | 12/2016 | Voss |
| 2017/0247080 A1 | 8/2017 | Tsuchizawa et al. |
| 2019/0300103 A1 | 10/2019 | Shahana |
| 2019/0300114 A1 | 10/2019 | Shahana |

FOREIGN PATENT DOCUMENTS

| | | |
|---|---|---|
| DE | 202014101790 U1 | 5/2014 |
| JP | 2004-142634 A | 5/2004 |
| JP | 2004-216970 A | 8/2004 |
| JP | 2017-154722 A | 9/2017 |
| WO | 2014/203542 A1 | 12/2014 |

HUMAN-POWERED VEHICLE CONTROL DEVICE, SUSPENSION SYSTEM, AND HUMAN-POWERED VEHICLE

CROSS-REFERENCE TO RELATED APPLICATIONS

This application claims priority under 35 U.S.C. § 120 to U.S. application Ser. No. 16/257,928, filed on Jan. 25, 2019. The entire disclosure of U.S. application Ser. No. 16/257,928 is hereby incorporated herein by reference. This application claims priority to Japanese Patent Application No. 2018-027934, filed on Feb. 20, 2018. The entire disclosure of Japanese Patent Application No. 2018-027934 is hereby incorporated herein by reference.

BACKGROUND

Technical Field

The present invention generally relates to a human-powered vehicle control device, a suspension system, and a human-powered vehicle.

Background Information

One example of a human-powered vehicle control device is disclosed Japanese Laid-Open Patent Publication No. 2004-142634. The human-powered vehicle control device detects a rotation state of a wheel.

SUMMARY

The control device controls an auxiliary driving device included in the human-powered vehicle in order to control the behavior of the human-powered vehicle in response to the rotation state of the wheel. However, studies have not been conducted on methods for controlling the behavior of a human-powered vehicle using devices other than the auxiliary driving device. One object of the present disclosure is to provide a human-powered vehicle control device, a suspension system, and a human-powered vehicle capable of suitably controlling a rotation state of a wheel of the human-powered vehicle.

A human-powered vehicle control device in accordance with a first aspect of the present disclosure comprises a first detector and an electronic controller. The first detector is configured to detect information related to a driving force of a wheel of a human-powered vehicle on a road surface. The electronic controller is configured to change an operation state of a suspension device of the human-powered vehicle in response to a detection result of the first detector.

In accordance with the first aspect, the operation state of the suspension device is suitably changed in response to the driving force of the wheel of the human-powered vehicle on the road surface. As a result, the rotation state of the wheel of the human-powered vehicle is suitably controlled.

In accordance with a second aspect of the present disclosure, in the human-powered vehicle control device according to the first aspect, the suspension device includes at least a first suspension, the first suspension is configured to be arranged between a frame of the human-powered vehicle and a rear wheel of the human-powered vehicle, and the electronic controller is configured to change the operation state of the first suspension in response to the detection result of the first detector.

In accordance with the second aspect, the rotation state of the rear wheel of the human-powered vehicle is suitably controlled by the first suspension.

In accordance with a third aspect of the present disclosure, in the human-powered vehicle control device according to the second aspect, the electronic controller is configured to control the suspension device so that the first suspension is in an unlocked state in response to the detection result of the first detector.

In accordance with the third aspect, the rotation state of the rear wheel is suitably controlled by setting the first suspension to the unlocked state.

In accordance with a fourth aspect of the present disclosure, the human-powered vehicle control device according to the first aspect further comprises a second detector configured to detect information related to a riding state of a rider of the human-powered vehicle. The electronic controller is configured to change the operation state of the suspension device in response to the detection result of the first detector and a detection result of the second detector.

In accordance with the fourth aspect, the suspension device is suitably controlled in response to the driving force of the wheel of the human-powered vehicle on the road surface and the posture of the rider.

In accordance with a fifth aspect of the present disclosure, in the human-powered vehicle control device according to the fourth aspect, the suspension device includes a first suspension and a second suspension, and the electronic controller is configured to change the operation state of at least one of the first suspension and the second suspension in response to the detection result of the first detector and the detection result of the second detector.

In accordance with the fifth aspect, the rotation state of the wheel of the human-powered vehicle is suitably controlled by at least one of the first suspension and the second suspension.

In accordance with a sixth aspect of the present disclosure, in the human-powered vehicle control device according to the fifth aspect, the electronic controller is configured to control the suspension device so that both the first suspension and the second suspension are in the unlocked state, upon the electronic controller determining that the wheel is in one of a wheelspin state and a slip state and a rider of the human-powered vehicle is in a seated state in response to the detection result of the first detector and the detection result of the second detector.

In accordance with the sixth aspect, in a case where the wheel is in the wheelspin state or the slip state and the posture of the rider is in the seated state, the first suspension and the second suspension are both set to the unlocked state to avoid the wheelspin state or the slip state of the wheel.

In accordance with a seventh aspect of the present disclosure, in the human-powered vehicle control device according to the fifth aspect, the electronic controller is configured to control the suspension device so that at least one of the first suspension and the second suspension is in the unlocked state upon the electronic controller determining that the wheel is in one of a wheelspin state and a slip state and a rider of the human-powered vehicle is in a non-seated state in response to the detection result of the first detector and the detection result of the second detector.

In accordance with the seventh aspect, in a case where the wheel is in the wheelspin state or the slip state and the posture of the rider is in the non-seated state, at least one of the first suspension and the second suspension is set in the unlocked state to avoid the wheelspin state or the slip state of the wheel.

In accordance with an eighth aspect of the present disclosure, in the human-powered vehicle control device according to the seventh aspect, the electronic controller is configured to control the suspension device so that the operation state of the second suspension is maintained and the first suspension is in the unlocked state upon the electronic controller determining that the wheel is in one of the wheelspin state and the slip state and the rider of the human-powered vehicle is in the non-seated state in response to the detection result of the first detector and the detection result of the second detector.

In accordance with the eighth aspect, in a case where the wheel is in the wheelspin state or the slip state and a posture of the rider is in the non-seated state, the first suspension is set to the unlocked state to avoid the wheelspin state or the slip state of the wheel. In addition, in a case where the wheel is in the wheelspin state or the slip state and the posture of the rider is in the non-seated state, the operation state of the second suspension is maintained such that the rider will feel no awkwardness.

In accordance with a ninth aspect of the present disclosure, in the human-powered vehicle control device according to any one of the fifth to eighth aspects, the first suspension is configured to be arranged between a frame of the human-powered vehicle and a rear wheel of the human-powered vehicle, and the second suspension is configured to be arranged between the frame of the human-powered vehicle and a front wheel of the human-powered vehicle.

In accordance with the ninth aspect, the impact applied to the rear wheel from the road surface is absorbed by the first suspension, and the impact applied to the front wheel from the road surface is absorbed by the second suspension.

In accordance with a tenth aspect of the present disclosure, in the human-powered vehicle control device according to any one of the first to ninth aspects, the wheel includes a drive wheel to which a human driving force is transmitted, the human-powered vehicle includes a human driving force transmission path extending from an input portion of the human driving force to a coupling portion where the drive wheel is coupled, and the first detector is configured to detect an angular acceleration of a rotation body included in the human driving force transmission path.

In accordance with the tenth aspect, the information related to the driving force of the wheel of the human-powered vehicle on the road surface is suitably detected from the angular acceleration of the rotation body included in the human driving force transmission path.

In accordance with an eleventh aspect of the present disclosure, the human-powered vehicle control device according to the tenth aspect is configured so that the rotation body includes a crankshaft.

In accordance with the eleventh aspect, the information related to the driving force of the wheel of the human-powered vehicle on the road surface is suitably detected from the angular acceleration of the crankshaft.

In accordance with a twelfth aspect of the present disclosure, in the human-powered vehicle control device according to the tenth aspect or the eleventh aspect, the electronic controller is configured to determine that the wheel is in the wheelspin state if the first detector detects that the angular acceleration is larger than or equal to a first predetermined value.

In accordance with the twelfth aspect, the wheelspin state of the wheel is suitably detected.

In accordance with a thirteenth aspect of the present disclosure, in the human-powered vehicle control device according to the twelfth aspect, the first detector is configured to further detect the human driving force in the human driving force transmission path, and the electronic controller is configured to determine that the wheel is in the wheelspin state where the first detector detects that the angular acceleration is larger than or equal to the first predetermined value and a decrease amount per unit time of the human driving force is larger than or equal to a second predetermined value.

In accordance with the thirteenth aspect, the wheelspin state of the wheel is further accurately detected.

In accordance with a fourteenth aspect of the present disclosure, in the human-powered vehicle control device according to any one of the first to ninth aspects, the wheel includes a drive wheel to which human driving force is transmitted, the first detector is configured to detect an angular acceleration of the drive wheel, and the electronic controller is configured to determine that the wheel is in one of a wheelspin state and a slip state in response to the detection result of the first detector.

In accordance with the fourteenth aspect, the wheelspin state or the slip state of the wheel is suitably detected.

In accordance with a fifteenth aspect of the present disclosure, in the human-powered vehicle control device according to any one of the first to ninth aspects, the wheel includes a drive wheel to which human driving force is transmitted and a driven wheel to which the human driving force is not transmitted, the first detector is configured to detect a difference between an angular velocity of the drive wheel and an angular velocity of the driven wheel, and the electronic controller is configured to determine that the wheel is in one of a wheelspin state and a slip state in response to the detection result of the first detector.

In accordance with the fifteenth aspect, the wheelspin state or the slip state of the wheel is suitably detected.

A suspension system in accordance with a sixteenth aspect of the present disclosure comprises the human-powered vehicle control device according to any one of first to fifteenth aspects, and the suspension device.

In accordance with the sixteenth aspect, the rotation state of the wheel of the human-powered vehicle is suitably detected.

A human-powered vehicle in accordance with a seventeenth aspect of the present disclosure comprises the suspension system according to the sixteenth aspect and an auxiliary driving device configured to assist propulsion of the human-powered vehicle.

In accordance with the seventeenth aspect, the rotation state of the wheel of the human-powered vehicle including the auxiliary driving device is suitably controlled.

A control system for a human-powered vehicle in accordance with an eighteenth aspect of the present disclosure comprises a suspension device, at least one detector, an electronic controller. The suspension device includes a first suspension and a second suspension. The at least one detector is configured to detect information related to at least two conditions of the human-powered vehicle. The conditions include an operating state of the suspension device, a power input to the human-powered vehicle, a torque of a power transmission component, and a rotating state of the power transmission component. The electronic controller is configured to selectively control the suspension device between a first operating state and a second operating state in accordance with a detection result obtained by the at least one detector.

The human-powered vehicle control device, the suspension system, and the human-powered vehicle in accordance with the present disclosure can suitably control the rotation state of the wheel of the human-powered vehicle.

BRIEF DESCRIPTION OF THE DRAWINGS

Referring now to the attached drawings which form a part of this original disclosure.

DETAILED DESCRIPTION OF EMBODIMENTS OF THE DISCLOSURE

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents. The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

A human-powered vehicle 10 in accordance with an embodiment will be described with reference to FIGS. 1 to 5. The human-powered vehicle 10 is a vehicle that can be driven by at least human driving force. The human-powered vehicle 10 includes, for example, a bicycle. The human-powered vehicle 10 can have any number of wheels, and includes, for example, a unicycle and a vehicle having three or more wheels. Examples of the human-powered vehicle include a mountain bike, a road bike, a city bike, a cargo bike, and a recumbent type bicycle. Hereinafter, in the embodiment, the human-powered vehicle 10 will be described as a bicycle.

Figure 1:
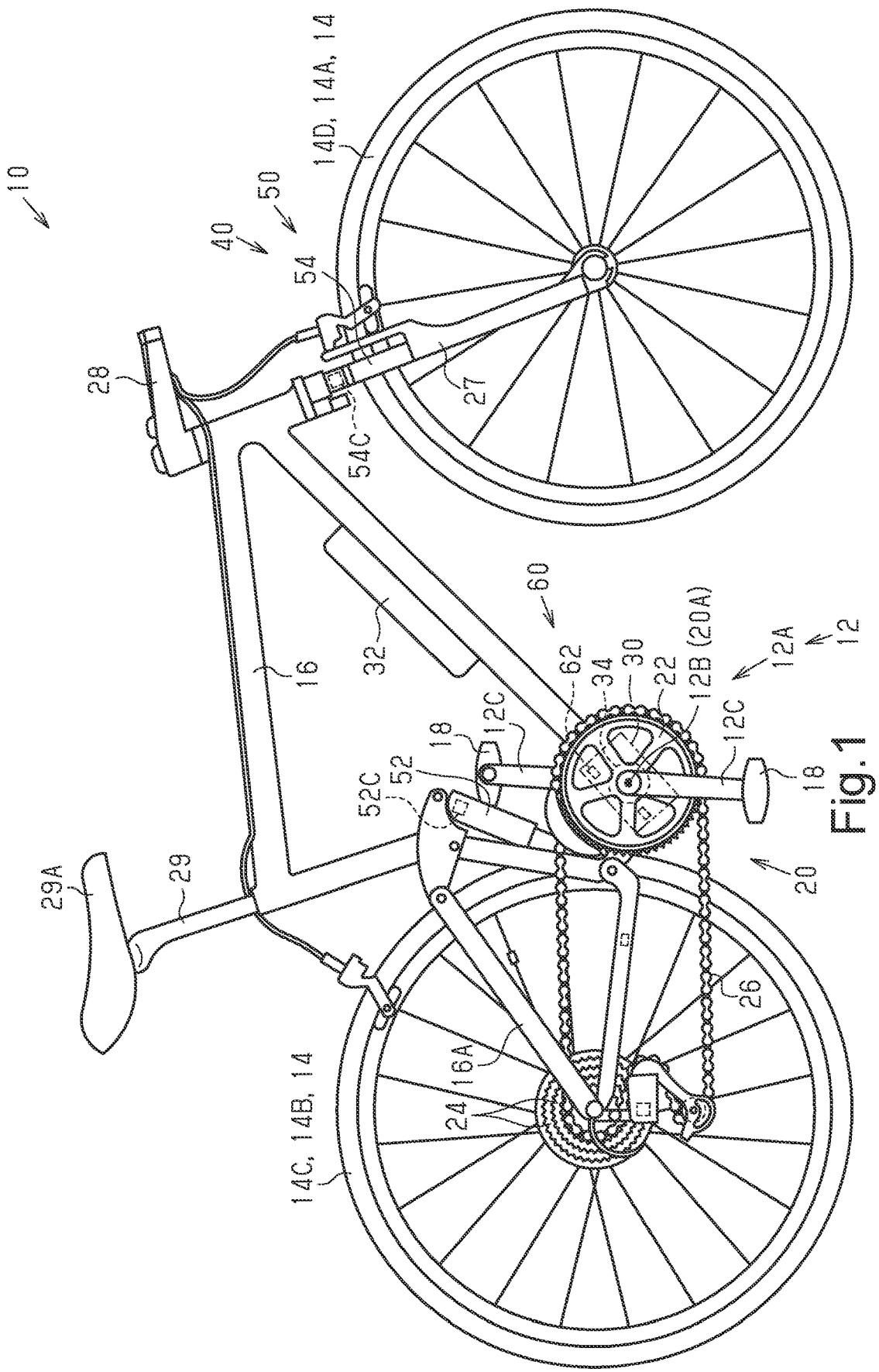
FIG. 1 is a side elevational view of a human-powered vehicle control device and a human-powered vehicle including a suspension system in accordance with an embodiment.

As shown in FIG. 1, the human-powered vehicle 10 further includes an input portion 12, wheels 14, a frame 16, a front fork 27, a handlebar 28, and a seat post 29. The input portion 12 includes a crank 12A. The human driving force is input to the input portion 12. The crank 12A includes a crankshaft 12B rotatable relative to the frame 16 and a pair of crank arms 12C provided on both axial ends of the crankshaft 12B. A pedal 18 is coupled to each of the crank arm 12C. The wheels 14 include a front wheel 14A and a rear wheel 14B. The wheels 14 include a drive wheel 14C to which the human driving force is transmitted. The wheels 14 include the drive wheel 14C to which the human driving force is transmitted and a driven wheel 14D to which the human driving force is not transmitted. The human-powered vehicle 10 has a human driving force transmission path extending from the input portion 12 for human driving force to a coupling portion where the drive wheel 14C is coupled. The coupling portion is a hub of the drive wheel 14C. In the present embodiment, the rear wheel 14B is described as the drive wheel 14C. However, the front wheel 14A can be the drive wheel 14C. The drive wheel 14C is driven by rotating the crank 12A. The drive wheel 14C is supported by the frame 16. The crank 12A and the drive wheel 14C are connected to each other by a driving mechanism 20. The driving mechanism 20 includes a first rotation body 22 coupled to the crankshaft 12B. The crankshaft 12B and the first rotation body 22 can be coupled to each other by a first one-way clutch. The first one-way clutch is configured to rotate the first rotation body 22 forward in a case where the crank 12A is rotated forward and not to rotate the first rotation body 22 backward in a case where the crank 12A is rotated backward. The first rotation body 22 includes a sprocket, a pulley, or a bevel gear. The driving mechanism 20 further includes a linking member 26 and a second rotation body 24. The linking member 26 transmits a rotating force of the first rotation body 22 to the second rotation body 24. The linking member 26 includes, for example, a chain, a belt, or a shaft.

The second rotation body 24 is connected to the drive wheel 14C. The second rotation body 24 includes a sprocket, a pulley, or a bevel gear. It is preferable that a second one-way clutch be arranged between the second rotation body 24 and the drive wheel 14C. The second one-way clutch is configured to rotate the drive wheel 14C forward in a case where the second rotation body 24 is rotated forward and so as not to rotate the drive wheel 14C backward in a case where the second rotation body 24 is rotated backward.

The front wheel 14A is mounted on the front fork 27. The handlebar 28 is connected to the front fork 27. The frame 16 rotatably supports the front fork 27 and the handlebar 28. A saddle 29A on which a rider is seated is mounted on the frame 16 by way of the seatpost 29.

The human-powered vehicle 10 includes an auxiliary driving device 30 configured to assist propulsion of the human-powered vehicle 10 and a suspension system 40. The human-powered vehicle 10 further includes a battery 32 that is configured to supply electric power to the auxiliary driving device 30 and the suspension system 40.

Figure 2:
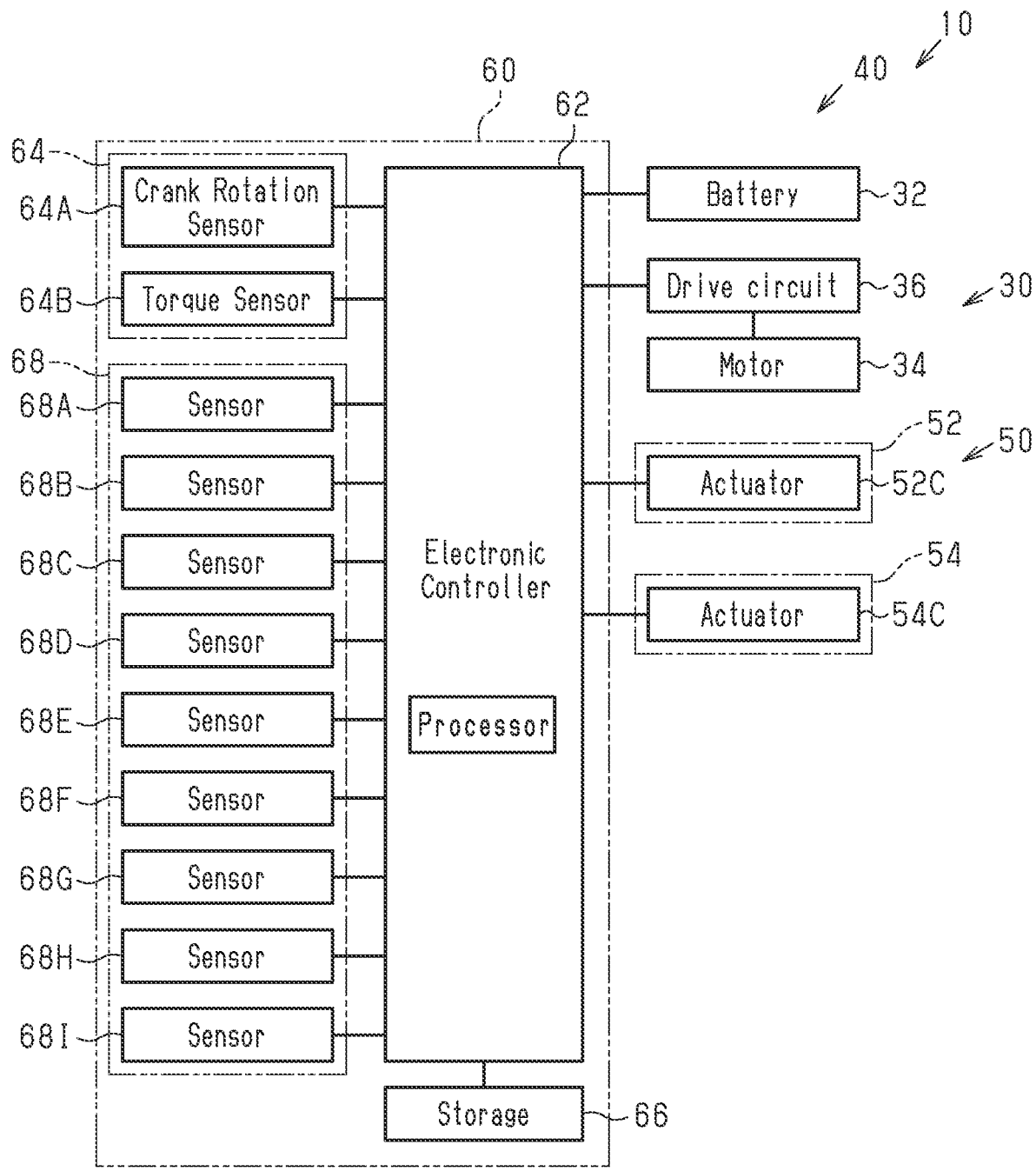
FIG. 2 is a block diagram showing an electrical configuration of the human-powered vehicle control device in accordance with the embodiment.

The auxiliary driving device 30 shown in FIG. 2 includes a motor 34 and a drive circuit 36. The motor 34 and the drive circuit 36 are preferably arranged in the same housing. The drive circuit 36 controls the electric power supplied from the battery 32 to the motor 34. The drive circuit 36 is connected to an electronic controller 62 of a control device 60 so as to be configured to communicate with the electronic controller 62 of the control device 60 through a wired connection or a wireless connection. The drive circuit 36 is configured to communicate with the electronic controller 62, for example, through serial communication. The drive circuit 36 drives the motor 34 in response to a control signal from the electronic controller 62. The motor 34 assists in the propulsion of the human-powered vehicle 10. The motor 34 includes an electric motor. The motor 34 is configured to transmit rotation to a power transmission path of the human driving force, which extends from the pedals 18 to the rear wheel, or the front wheel 14A. The motor 34 is provided on the frame 16, the rear wheel 14B, or the front wheel 14A of the human-powered vehicle 10. In one example, the motor 34 is coupled to a power transmission path extending from the crankshaft 12B to the first rotation body 22. It is preferable that the power transmission path between the motor 34 and the crankshaft 12B be provided with the one-way clutch so that the motor 34 is not rotated by the rotating force of the crank 12A in a case where the human-powered vehicle 10 rotates the crankshaft 12B in a forward direction. The housing provided with the motor 34 and the drive circuit 36 can be provided with components other than the motor 34 and the drive circuit 36, for example, a speed reducer that decelerates and outputs the rotation of the motor 34.

The battery 32 includes one or more battery cells. The battery cell includes a rechargeable battery. The battery 32 is arranged in the human-powered vehicle 10 and supplies electric power to other electrical components, such as the auxiliary driving device 30 and the control device 60, which are electrically wire-connected to the battery 32. The battery 32 is connected to the electronic controller 62 of the control device 60 so as to be configured to communicate with the electronic controller 62 of the control device 60 through a wired connection or a wireless connection. The battery 32 is configured to communicate with the electronic controller 62, for example, through power line communication (PLC). The battery 32 can be attached to the outside of the frame 16. Alternatively, the battery 32 can be at least partially accommodated in the frame 16.

The suspension system 40 includes a suspension device 50 and the control device 60 of the human-powered vehicle 10. The suspension device 50 includes at least a first suspension 52. The suspension device 50 includes the first suspension 52 and a second suspension 54. The suspension device 50 absorbs the impact applied to the wheel 14.

The first suspension 52 shown in FIG. 1 is configured to be arranged between the frame 16 and the rear wheel 14B of the human-powered vehicle 10. More specifically, the first suspension 52 is arranged between the frame 16 and a swing arm 16A supporting the rear wheel 14B. The first suspension 52 absorbs the impact applied to the rear wheel 14B. The first suspension 52 can be a hydraulic suspension or an air suspension.

Figure 3:
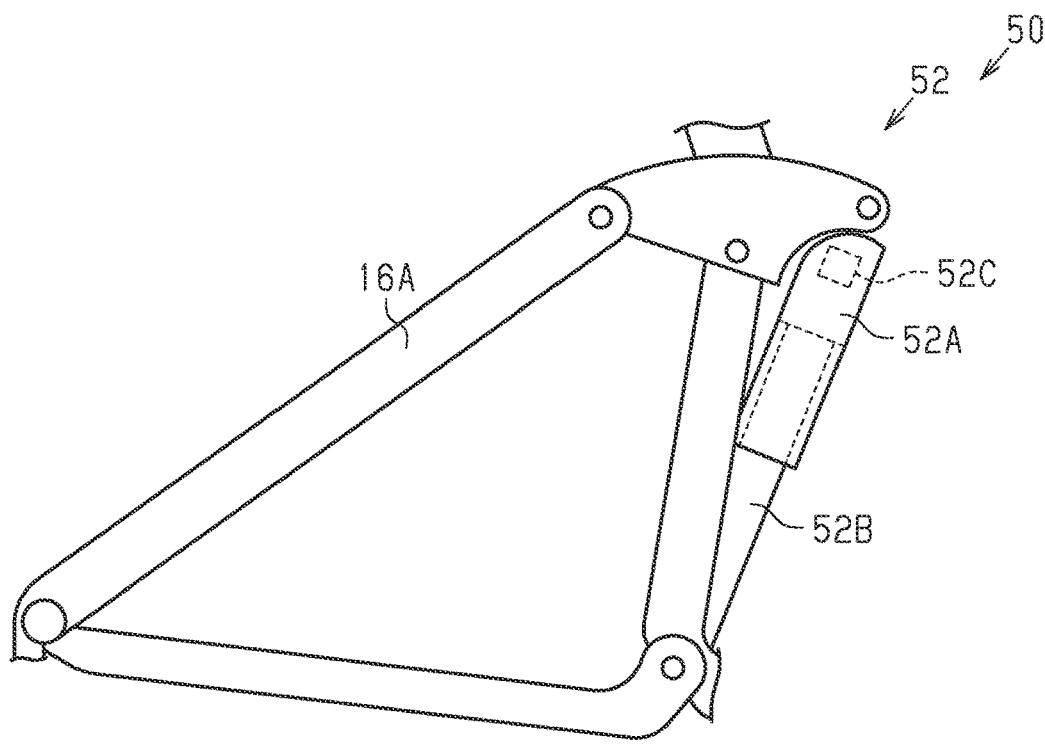
FIG. 3 is a side elevational view of a first suspension in FIG. 1.

As shown in FIG. 3, the first suspension 52 includes a first portion 52A and a second portion 52B, which is fitted in the first portion 52A and movable relative to the first portion 52A. The operation states of the first suspension 52 include a locked state where relative movement between the first portion 52A and the second portion 52B is restricted and an unlocked state where relative movement between the first portion 52A and the second portion 52B is permitted. The first suspension 52 further includes an actuator 52C. The actuator 52C includes, for example, an electric motor. The actuator 52C switches the operation state of the first suspension 52. The locked state of the first suspension 52 can include a state where the first portion 52A and the second portion 52B slightly move relative with each other in a case where a strong force is applied to the rear wheel 14B.

The second suspension 54 shown in FIG. 1 is arranged between the frame 16 and the front wheel 14A of the human-powered vehicle 10. More specifically, the second suspension 54 is provided on the front fork 27. The second suspension 54 absorbs the impact applied to the front wheel 14A. The second suspension 54 can be a hydraulic suspension or an air suspension.

Figure 4:
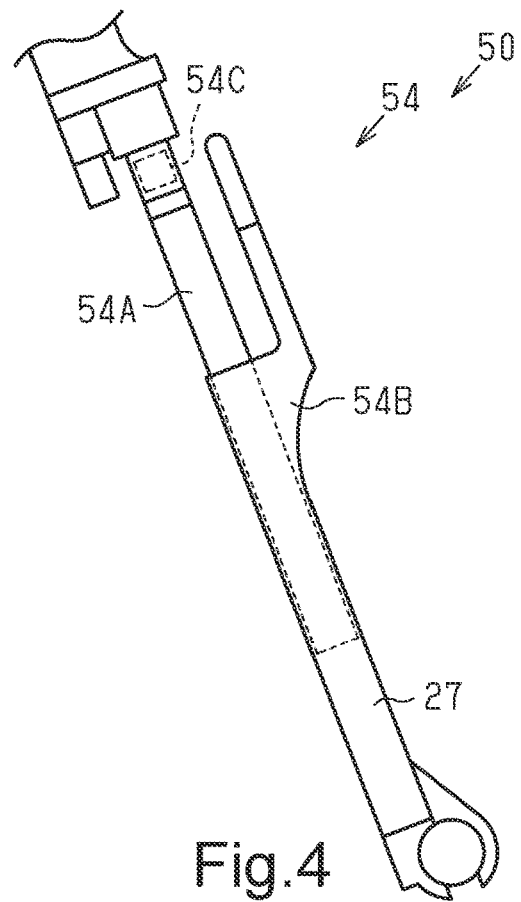
FIG. 4 is a side elevational view of a second suspension in FIG. 1.

As shown in FIG. 4, the second suspension 54 includes a first portion 54A and a second portion 54B, which is fitted to the first portion 54A and movable relative to the first portion 54A. The operation states of the second suspension 54 include a locked state where the relative movement between the first portion 54A and the second portion 54B is restricted and an unlocked state where the relative movement between the first portion 54A and the second portion 54B is permitted. The second suspension 54 further includes an actuator 54C. The actuator 54C includes, for example, an electric motor. The actuator 54C switches the operation state of the second suspension 54. The locked state of the second suspension 54 can include a state where the first portion 54A and the second portion 54B slightly move relative to each other in a case where a strong force is applied to the front wheel 14A.

As shown in FIG. 2, the control device 60 includes the electronic controller 62 and a first detector 64. In one embodiment, the control device 60 further includes a storage 66 and a second detector 68. The term "detector" is a device(s) that detects information relating to the human-powered vehicle 10 and does not include a human.

The electronic controller 62 includes at least one processor that executes a predetermined control program. The processor includes, for example, a central processing unit (CPU) or a micro-processing unit (MPU). The electronic controller 62 can include one or a plurality of microcomputers. The electronic controller 62 is preferably a microcomputer that includes one or more processors. The electronic controller 62 is formed of one or more semiconductor chips that are mounted on a printed circuit board. The term "electronic controller" as used herein refers to hardware that executes a software program. The memory or storage 66 stores various control programs and information used for various control processing. The storage 66 is any computer storage device or any computer readable medium with the sole exception of a transitory, propagating signal. The storage 66 includes, for example, a nonvolatile memory and a volatile memory. The electronic controller 62 and the storage 66 are arranged in, for example, the housing provided with the motor 34.

The first detector 64 is configured to detect the information related to the driving force of the wheel 14 of the human-powered vehicle 10 on the road surface. The driving force transmitted to the drive wheel 14C (e.g., the rear wheel 14B) includes human driving force and assist force. The information related to the driving force of the wheel 14 on the road surface includes parameters of detection indices of the wheelspin state or the slip state of the wheel 14. As used herein, a wheelspin state refers to a state in which a driving force does not correctly transmit to the ground due to some reason, for example the assist force increases too much in comparison with the frictional characteristic of ground. In such a wheelspin state, the drive wheel 14C (the rear wheel 14B) will spin too much in comparison with the human driving force. On the other hand, as used herein, a slip state refers to a state in which the driven wheel 14D (e.g., the front wheel 14A) will spin too comparison with the driving force transmitted to the drive wheel 14C (e.g., the rear wheel 14B). In such a slip state, the driving force correctly transmits to the drive wheel 14C (e.g., the rear wheel 14B), but the driven wheel 14D (e.g., the front wheel 14A) will spin due to some reason, for example frictional characteristic of ground. The first detector 64 is configured to detect an angular acceleration W of the rotation body 20A included in the human driving force transmission path. The rotation body 20A includes the crankshaft 12B. The first detector 64 is configured to further detect the human driving force in the human driving force transmission path. The first detector 64 includes, for example, a crank rotation sensor 64A and a torque sensor 64B.

The crank rotation sensor 64A detects the rotational speed of the crank 12A. The crank rotation sensor 64A is attached to a housing on with the frame 16 or the motor 34 of the human-powered vehicle 10. The crank rotation sensor 64A includes a magnetic sensor outputting a signal in response to the intensity of a magnetic field. An annular magnet of which magnetic field intensity is changed in a circumferential direction is provided on the crankshaft 12B or the power transmission path from the crankshaft 12B to the first rotation body 22. The crank rotation sensor 64A is connected to the electronic controller 62 and configured to communicate with the electronic controller 62 through a wired connection or a wireless connection. The crank rotation sensor 64A outputs a signal in response to the rotational speed of the crank 12A to the electronic controller 62.

The crank rotation sensor 64A can be provided on a member that is integrally rotated with the crankshaft 12B in the power transmission path of the human driving force from the crankshaft 12B to the first rotation body 22. For example, the crank rotation sensor 64A can be provided on the first rotation body 22 in a case where the one-way clutch is not provided between the crankshaft 12B and the first rotation body 22.

The torque sensor 64B is arranged in the housing provided with the motor 34. The torque sensor 64B detects the human driving force input to the crank 12A. The torque sensor 64B is arranged, for example, upstream from a first one-way clutch in the power transmission path. The torque sensor 64B includes a strain sensor, a magnetostrictive sensor, or the like. The strain sensor includes a strain gauge. In a case where the torque sensor 64B includes the strain sensor, the strain sensor is provided on an outer circumferential portion of the rotation body included in the power transmission path. The torque sensor 64B can include a wireless communicator or a wired communicator. The communicator of the torque sensor 64B is configured to communicate with the electronic controller 62.

In a case where the first detector 64 detects that the angular acceleration W is larger than or equal to a first predetermined value WA, the electronic controller 62 is configured to determine that the wheel 14 is in a wheelspin state. In a case where the first detector 64 detects that the angular acceleration W is larger than or equal to the first predetermined value WA and that a decrease amount per unit time of the human driving force is larger than or equal to a second predetermined value DH, it is further preferable that the electronic controller 62 be configured to determine that the wheel 14 is in a wheelspin state. The first predetermined value WA is set to correspond to the angular acceleration W of the rotation body 20A in a case where the wheel 14 is in the wheelspin state. The second predetermined value DH is set to correspond to the decrease amount per unit time of the human driving force in a case where the wheel 14 is in the wheelspin state. It is preferable that the first detector 64 be configured to detect wheelspin of the drive wheel 14C.

In a case where the first detector 64 detects that the angular acceleration W is smaller than a third predetermined value WB, the electronic controller 62 is configured to determine that the wheel 14 is in a slip state. In a case where the first detector 64 detects that the angular acceleration W is smaller than or equal to the third predetermined value WB and the first detector 64 detects the human driving force is larger than or equal to a fourth predetermined value HA, it is further preferable that the electronic controller 62 be configured to determine that the wheel 14 is in a slip state.

The second detector 68 is configured to detect information related to a riding state of a rider of the human-powered vehicle 10. The second detector 68 includes at least one of a sensor 68A, a sensor 68B, a sensor 68C, a sensor 68D, a sensor 68E, a sensor 68F, a sensor 68G, a sensor 68H, and a sensor 68I.

The sensor 68A detects the force applied to the crank 12A of the human-powered vehicle 10. The sensor 68A can be included in the torque sensor 64B or can be separate from the torque sensor 64B. The sensor 68A outputs a signal in response to the force applied to the crank 12A. In a case where the rider is pedaling the crank 12A in a posture corresponding to a non-seated state, the force applied to the crank 12A is larger than a case where the rider is pedaling the crank 12A in a posture corresponding to a seated state. The electronic controller 62 determines the posture of the rider in accordance with the magnitude of the force applied to the crank 12A detected by the sensor 68A. The sensor 68A has the same construction as that of the torque sensor 64B. For example, in a case where the magnitude of the force applied to the crank 12A and the rotational angle of the crank 12A satisfy a predetermined relationship, the electronic controller 62 can determine that the rider is in the non-seated state. The electronic controller 62 can determine that the rider is in the non-seated state in a case where the magnitude of the force applied to the crank 12A is larger than or equal to the predetermined value.

The sensor 68B detects the force applied to the pedal 18. The sensor 68B includes, for example, a pedaling force meter or a power meter provided on the pedal 18. The sensor 68B outputs a signal in response to the force applied to the pedal 18. In a case where the rider is pedaling the crank 12A in a posture corresponding to a non-seated state, the force applied to the pedal 18 is larger than a case where the rider is pedaling the crank 12A in a posture corresponding to the seated state. The electronic controller 62 determines the posture of the rider in accordance with the magnitude of the force applied to the pedal 18 detected by the sensor 68B. In a case where the magnitude of the force applied to the pedal 18 and the rotational angle of the crank 12A satisfy the predetermined relationship, the electronic controller 62 can, for example, determine that the rider is in a non-seated state. The electronic controller 62 can determine that the rider is in the non-seated state in a case where the magnitude of the force applied to the pedal is larger than or equal to the predetermined value.

The sensor 68C detects the force applied to the frame 16. The sensor 68C is provided on, for example, the frame to detect the distortion of the frame 16. The sensor 68C outputs a signal in response to the force applied to the frame 16. In a case where the rider is pedaling the crank 12A in a posture corresponding to the non-seated state, the distortion of the frame 16 is larger than a case where the rider is pedaling the crank 12A in a posture corresponding to a seated state. The electronic controller 62 determines the posture of the rider in accordance with the magnitude of the distortion of the frame 16 detected by the sensor 68C. The sensor 68C includes, for example, the strain sensor. For example, in a case where the distortion amount of the frame 16 is larger than or equal to the predetermined value, the electronic controller 62 determines that the rider is in the non-seated state.

The sensor 68D detects the force applied to the saddle 29A. The sensor 68D is provided on, for example, the saddle 29A to detect a load of a rider applied to the saddle 29A. The sensor 68D outputs a signal in response to the force applied to the saddle 29A. In a case where the rider is pedaling the crank 12A in a posture corresponding to the non-seated state, the force applied to the saddle 29A is smaller than a case where the rider is pedaling the crank 12A in a posture corresponding to a seated state. The electronic controller 62 determines the posture of the rider in accordance with the magnitude of the force applied to the saddle 29A detected by the sensor 68D. The sensor 68D includes, for example, a pressure sensor. For example, in a case where the load of the rider applied to the saddle 29A is smaller than the predetermined value, the electronic controller 62 determines that the rider is in the non-seated state.

The sensor 68E detects the force applied to the seat post 29. The sensor 68E is provided on, for example, the seat post 29 to detect the load of the rider applied to the seat post 29. The sensor 68E outputs a signal in response to the force applied to the seat post 29. In a case where the rider is pedaling the crank 12A in a posture corresponding to the non-seated state, the force applied to the seat post 29 is smaller than a case where the rider is pedaling the crank 12A in a posture corresponding to a seated state. The electronic controller 62 determines the posture of the rider in accordance with the magnitude of the force applied to the seat post 29 detected by the sensor 68E. The sensor 68E includes, for example, the strain sensor. For example, in a case where the load of the seat post 29 is smaller than the predetermined value, the electronic controller 62 determines that the rider is in the non-seated state.

The sensor 68F detects the force applied to the handlebar 28. The sensor 68F is provided on, for example, the handlebar 28 to detect the load of the rider applied to the handlebar 28. The sensor 68F outputs a signal in response to the force applied to the handlebar 28. In a case where the rider is pedaling the crank 12A in a posture corresponding to the non-seated state, the force applied to the handlebar 28 is larger than a case where the rider is pedaling the crank 12A in the seated state. The electronic controller 62 determines the posture of the rider in accordance with the magnitude of the force applied to the handlebar 28 detected by the sensor 68F. The sensor 68F includes, for example, the strain sensor. For example, in a case where the load of the handlebar 28 is larger than or equal to the predetermined value, the electronic controller 62 determines that the rider is in the non-seated state.

The sensor 68G is mounted on the human-powered vehicle 10. The sensor 68G includes, for example, an image sensor and forms a camera. The sensor 68G is provided on the handlebar 28 to detect an image behind the handlebar 28. The sensor 68G outputs a captured image of the rider. The electronic controller 62 determines the posture of the rider in accordance with captured image data of the rider acquired by the sensor 68G. For example, the electronic controller 62 compares the captured image data of the rider with predetermined image data to determine that the rider is in the non-seated state if the similarity is larger than or equal to the predetermined value.

The sensor 68H detects an inclination in a roll direction of the human-powered vehicle 10. The sensor 68H includes, for example, an inclination sensor. The inclination sensor includes, for example, at least one of a gyro sensor and an acceleration sensor. The sensor 68H is provided on, for example, the frame 16 to detect the inclination in the roll direction of the frame 16. The sensor 68H detects a signal in response to the inclination in the roll direction of the human-powered vehicle 10. In a case where the rider is pedaling the crank 12A in a posture corresponding to the non-seated state, a movement amount in the roll direction of the frame 16 is larger than a case where the rider is pedaling the crank 12A in a posture corresponding to a seated state. The electronic controller 62 determines the posture of the rider in accordance with the inclination in the roll direction of the human-powered vehicle 10 detected by the sensor 68H. For example, in a case where the inclination in the roll direction of the frame 16 repeatedly becomes larger than or equal to the predetermined value or smaller than the predetermined value, the electronic controller 62 determines that the rider is in the non-seated state.

The sensor 68I detects the acceleration in the roll direction of the human-powered vehicle 10. The sensor 68I includes, for example, an acceleration sensor. The sensor 68I is provided on, for example, the frame 16 to detect the acceleration in the roll direction of the frame 16. The sensor 68I detects a signal in response to the acceleration in the roll direction of the human-powered vehicle 10. In a case where the rider is pedaling the crank 12A in a posture corresponding to the non-seated state, the acceleration in the roll direction of the frame 16 is larger than a case where the rider is pedaling the crank 12A in a posture corresponding to a seated state. The electronic controller 62 determines the posture of the rider in accordance with the acceleration in the roll direction of the human-powered vehicle 10 detected by the sensor 68I. For example, in a case where the acceleration in the roll direction of the frame 16 repeatedly becomes larger than or equal to the predetermined value or smaller than the predetermined value, the electronic controller 62 determines that the rider is in the non-seated state.

The electronic controller 62 is programmed to control the motor 34. The electronic controller 62 changes a ratio of an assist force generated by the motor 34 to the human driving force input to the crank 12A in response to the human driving force. The electronic controller 62 changes the ratio in response to the human driving force and the rotational speed of the crank 12A. A ratio of the torque of the assist force by the motor 34 to the input torque of the human driving force input to the human-powered vehicle 10 can be referred to as the ratio. The ratio of power (watt) of the assist force generated by the motor 34 to power (watt) of the human driving force input to the human-powered vehicle 10 can be referred to as the ratio. The power of the human driving force is calculated by multiplying the torque of the human driving force input to the crank 12A by the rotational speed of the crank 12A. In a case where the output of the motor 34 is input to the power transmission path of the human driving force by the speed reducer, the output of the speed reducer is set as the assist force by the motor 34.

The electronic controller 62 is configured to change the operation state of the suspension device 50 of the human-powered vehicle 10 in response to the detection result of the first detector 64. The electronic controller 62 is configured to change the operation state of the suspension device 50 in a case where the wheel 14 is in the wheelspin state or the slip state in response to the detection result of the first detector 64.

The electronic controller 62 is configured to change the operation state of the first suspension 52 in response to the detection result of the first detector 64. The electronic controller 62 is configured to change the operation state of the suspension device 50 in a case where the wheel 14 is in the wheelspin state or the slip state in response to the detection result of the first detector 64. The electronic controller 62 is configured to control the suspension device 50 in response to the detection result of the first detector 64 so that the first suspension 52 is in the unlocked state. More specifically, in a case where the detection result of the first detector 64 becomes a value corresponding to the wheelspin state or the slip state of the wheel 14 and the first suspension 52 is in the locked state, the electronic controller 62 is configured to change the first suspension 52 to the unlocked state. In a case where the detection result of the first detector 64 becomes the value corresponding to the wheelspin state or the slip state of the wheel 14 and the first suspension 52 is in the unlocked state, the electronic controller 62 is configured to maintain the first suspension 52 in the unlocked state of.

The electronic controller 62 is configured to change the operation state of the suspension device 50 in response to the detection result of the first detector 64 and the detection result of the second detector 68. The electronic controller 62 is configured to change the operation state of the suspension device 50 in response to the posture of the rider of the human-powered vehicle 10 in a case where the wheel 14 is in the wheelspin state or the slip state in response to the detection result of the first detector 64 and the detection result of the second detector 68. The electronic controller 62 is configured to change at least one of the operation states of the first suspension 52 and the second suspension 54 in response to the detection result of the first detector 64 and the detection result of the second detector 68.

If it is determined that the wheel 14 is in the wheelspin state or the slip state and the rider of the human-powered vehicle 10 is in the seated state in response to the detection result of the first detector 64 and the detection result of the second detector 68, the electronic controller 62 is configured to control the suspension device 50 so that the both the first suspension 52 and the second suspension 54 are in the unlocked state. More specifically, in a case where the detection result of the first detector 64 becomes the value corresponding to the wheelspin state or the slip state of the wheel 14 and in a case where the rider of the human-powered vehicle 10 is in the seated state and the first suspension 52 is in the locked state, the electronic controller 62 is configured to change the first suspension 52 to the unlocked state. In a case where the detection result of the first detector 64 becomes the value corresponding to the wheelspin state or the slip state of the wheel 14, the rider of the human-powered vehicle 10 is in the seated state, and the first suspension 52 is in the unlocked state, the electronic controller 62 is configured to maintain the first suspension 52 in the unlocked state. In a case where the detection result of the first detector 64 becomes the value corresponding to the wheelspin state or the slip state of the wheel 14, the rider of the human-powered vehicle 10 is in the seated state, and the second suspension 54 is in the locked state, the electronic controller 62 is configured to change the second suspension 54 to the unlocked state. In a case where the detection result of the first detector 64 becomes the value corresponding to the wheelspin state or the slip state of the wheel 14, the rider of the human-powered vehicle 10 is in the seated state, and the second suspension 54 is in the unlocked state, the electronic controller 62 is configured to maintain the second suspension 54 in the unlocked state.

If it is determined that the wheel 14 is in the wheelspin state or the slip state and the rider of the human-powered vehicle 10 is in the non-seated state in response to the detection result of the first detector 64 and the detector of the second detector 68, the electronic controller 62 is configured to control the suspension device 50 so that at least one of the first suspension 52 and the second suspension 54 is in the unlocked state. If it is determined that the wheel 14 is in the wheelspin state or the slip state and the rider of the human-powered vehicle 10 is in the non-seated state in response to the detection result of the first detector 64 and the detection result of the second detector 68, the electronic controller 62 is configured to maintain the operation state of the second suspension 54 and control the suspension device 50 so that the first suspension 52 is in the unlocked state. More specifically, in a case where the detection result of the first detector 64 becomes the value corresponding to the wheelspin state or the slip state of the wheel 14 and in a case where the rider of the human-powered vehicle 10 is in the non-seated state and the first suspension 52 is in the locked state, the electronic controller 62 is configured to change the first suspension 52 to the unlocked state. In a case where the detection result of the first detector 64 becomes the value corresponding to the wheelspin state or the slip state of the wheel 14, the rider of the human-powered vehicle 10 is in the non-seated state, and the first suspension 52 is in the unlocked state, the electronic controller 62 is configured to maintain the first suspension 52 in the unlocked state. In a case where the detection result of the first detector 64 becomes the value corresponding to the wheelspin state or the slip state of the wheel 14, the rider of the human-powered vehicle 10 is in the non-seated state, and the second suspension 54 is in the locked state, the electronic controller 62 is configured to maintain the second suspension 54 in the locked state. In a case where the detection result of the first detector 64 becomes the value corresponding to the wheelspin state or the slip state of the wheel 14, the rider of the human-powered vehicle 10 is in the non-seated state, and the second suspension 54 is in the unlocked state, the electronic controller 62 is configured to maintain the second suspension 54 in the unlocked state.

Figure 5:
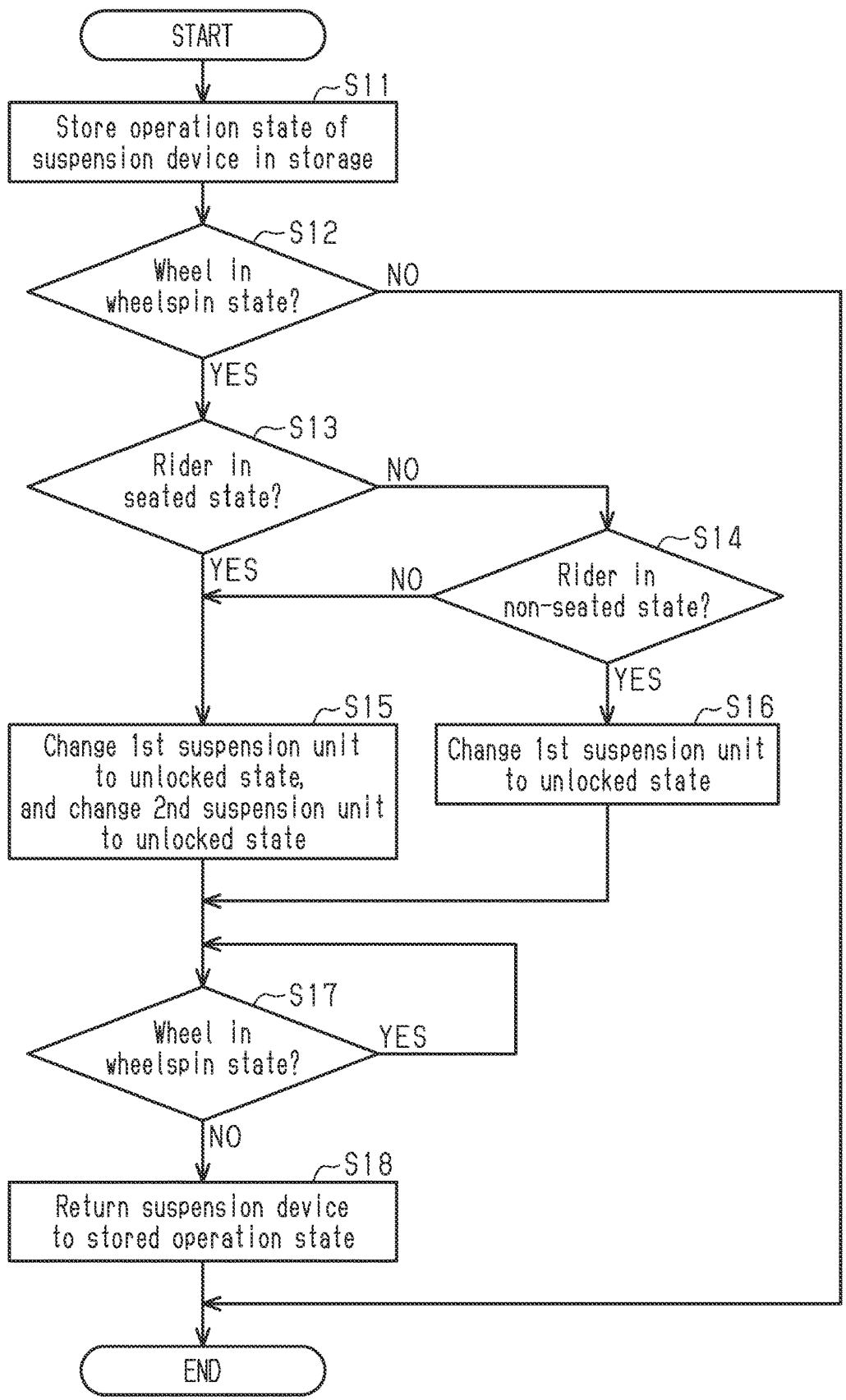
FIG. 5 is a flowchart of a processing for changing an operation state of a suspension device executed by an electronic controller in FIG. 2.

With reference to FIG. 5, the process for changing the operation state of the suspension device 50 will now be described. If electric power is supplied from the battery 32 to the electronic controller 62, the electronic controller 62 starts the processing and proceeds to step S11 of the flowchart shown in FIG. 5. As long as electric power is supplied, the electronic controller 62 executes processing from step S11 in predetermined cycles.

In step S11, the electronic controller 62 stores the current operation state of the suspension device 50 in the storage 66 and then proceeds to step S12. In step S12, the electronic controller 62 determines whether the wheel 14 is in the wheelspin state. In a case where the wheel 14 is not in the wheelspin state, the electronic controller 62 ends the processing. In a case where the wheel 14 is in the wheelspin state, the electronic controller 62 proceeds to step S13. Specifically, in a case where the first detector 64 detects the angular acceleration W larger than or equal to the first predetermined value WA and the first detector 64 detects the decrease amount per unit time of the human driving force larger than or equal to the second predetermined value DH, the electronic controller 62 proceeds to step S13.

In step S13, the electronic controller 62 determines whether the rider is in the seated state. If it is determined that the rider is in the seated state, the electronic controller 62 proceeds to step S15. More specifically, in a case where the detection result of the second detector 68 corresponds to the seated state of the rider, the electronic controller 62 proceeds to step S15. If it is determined in step S13 that the rider is not in the seated state, the electronic controller 62 proceeds to step S15. In step S15, the electronic controller 62 determines whether the rider is in the non-seated state. If it is determined that the rider is in the non-seated state, the electronic controller 62 proceeds to step S16. More specifically, in a case where the detection result of the second detector 68 corresponds to the non-seated state of the rider in step S14, the electronic controller 62 proceeds to step S16. If it is determined in step S14 that the rider is not in the non-seated state, that is, if it is not determined that the rider is in any one of the seated state and the non-seated state, the electronic controller 62 proceeds to step S15.

In step S15, the electronic controller 62 changes the first suspension 52 to the unlocked state and changes the second suspension 54 to the unlocked state and then proceeds to step S17. In step S16, the electronic controller 62 changes the first suspension 52 to the unlocked state and then proceeds to step S17.

In step S17, the electronic controller 62 determines whether the wheel 14 is in the wheelspin state. As long as the wheelspin state of the wheel 14 continues, the electronic controller 62 repeats the determination processing of step S17. In a case where it is determined that the wheel 14 is not in the wheelspin state, the electronic controller 62 proceeds to step S18.

In step S18, the electronic controller 62 returns to the operation state of the suspension device 50 stored in the storage 66 and then ends the processing. Specifically, the electronic controller 62 changes the operation states of the first suspension 52 and the second suspension 54 so that the operation states of the first suspension 52 and the second suspension 54 become the operation state of the suspension device 50 stored in the storage 66 in step S11.

The operation of the control device 60 will now be described. In a case where the wheel 14 is in the wheelspin state or the slip state, the suspension device 50 of the human-powered vehicle 10 is in the unlocked state, the wheel 14 is pushed against the road surface, such that the driving force of the wheel 14 on the road surface is changed to an appropriate state. This avoids a wheelspin state or a slip state.

In a case where the rider of the human-powered vehicle 10 is in the seated state, the load of the rider and the load of the human-powered vehicle 10 are relatively dispersed in the front wheel 14A and the rear wheel 14B. Therefore, in a case where the rider of the human-powered vehicle 10 is in the seated state, both the first suspension 52 and the second suspension 54 are changed to the unlocked state to avoid the wheelspin state. In a case where the rider of the human-powered vehicle 10 is in the non-seated state, the load of the rider and the load of the human-powered vehicle 10 has a tendency to being shifted toward the front wheel 14A. Therefore, in a case where the rider of the human-powered vehicle 10 is in the non-seated state, the first suspension 52 is changed to the unlocked state such that a distribution ratio of the load to the rear wheel 14B can be increased. This suitably avoids the wheelspin state of the rear wheel 14B. In addition, in a case where the rider of the human-powered vehicle 10 is in the non-seated state and the second suspension 54 is in the locked state, the suspension 54 is maintained in the locked state to limit increases in the distribution ratio of the load to the front wheel 14A can be suppressed. This suitably avoids a wheelspin state of the rear wheel 14B.

Modifications

The description related with the above embodiment exemplifies, without any intention to limit, an applicable form of a human-powered vehicle control device, a suspension system, and a human-powered vehicle according to the present disclosure. In addition to the embodiment described above, the human-powered vehicle control device, the suspension system, and the human-powered vehicle according to the present disclosure are applicable to, for example, modifications of the above embodiment that are described below and combinations of at least two of the modifications that do not contradict each other. In the modifications described hereinafter, same reference numerals are given to those components that are the same as the corresponding components of the above embodiment. Such components will not be described in detail.

Figure 6:
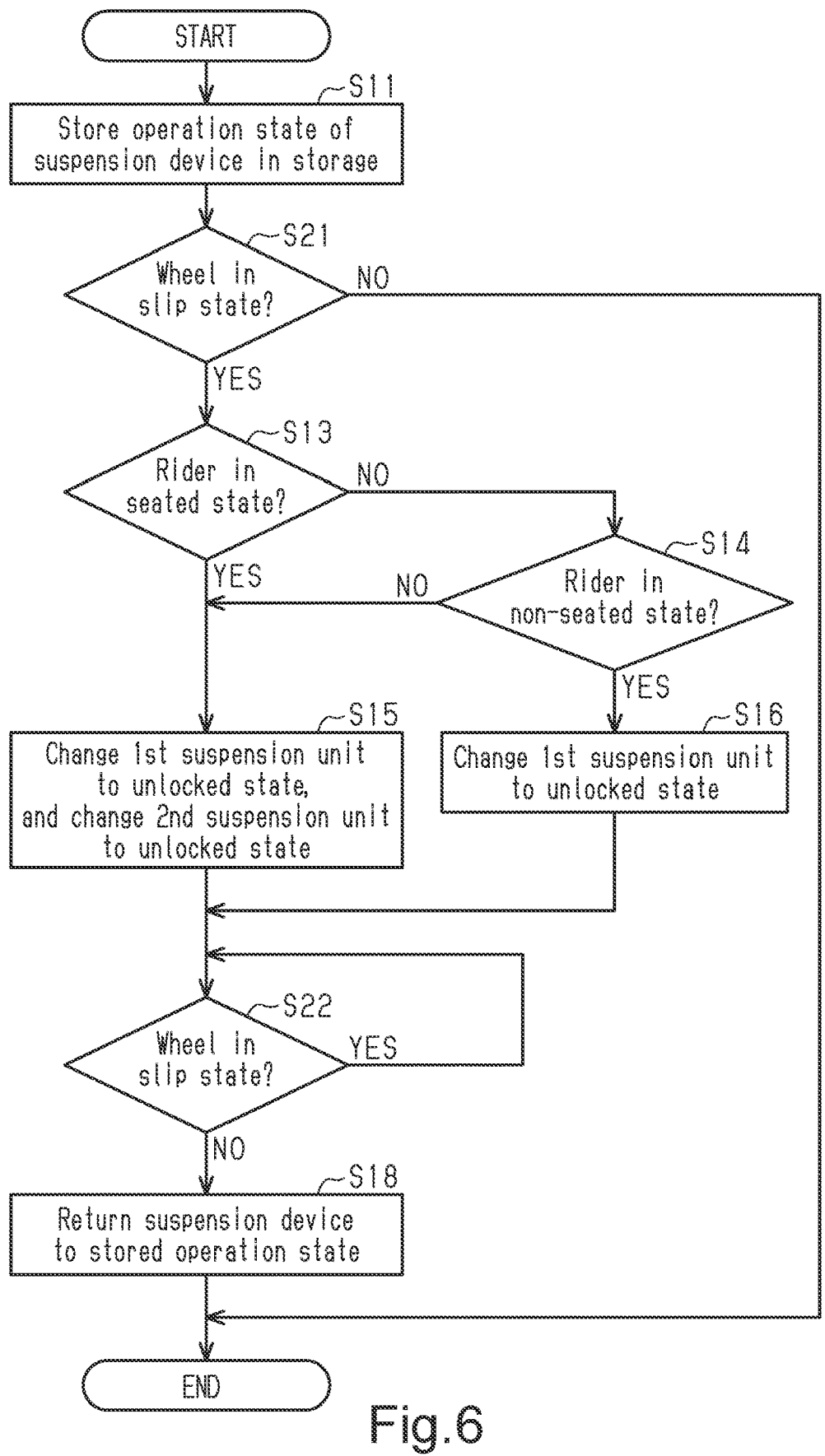
FIG. 6 is a flowchart of a process for changing an operation state of a suspension device executed by an electronic controller in accordance with a first modification.

The process for changing the operation state of the suspension device 50 in FIG. 5 can be changed as shown in FIG. 6. Instead of step S12 of FIG. 5, step S21 is executed in FIG. 6. In addition, instead of step S17 of FIG. 5, step S22 is executed in FIG. 6. After step S11, the electronic controller 62 proceeds to step S21. In step S21, the electronic controller 62 determines whether the wheel 14 is in the slip state. In a case where the wheel 14 is in a slip state, the electronic controller 62 proceeds to step S13. In a case where the wheel 14 is not in the slip state, the electronic controller 62 ends the process of FIG. 6. After step S15 or step S16, the electronic controller 62 proceeds to step S22. In step S22, the electronic controller 62 determines whether the wheel 14 is in the slip state. As long as the slip state of the wheel 14 continues, the electronic controller 62 repeats the determination processing of step S22. In a case where it is determined that the wheel 14 is not in the slip state, the electronic controller 62 proceeds to step S18.

The electronic controller 62 can execute step S21 of FIG. 6 in addition to step S12 of FIG. 5 and can execute step S22 in addition to step S17 of FIG. 5. In this case, in a case where the wheel 14 is in at least one of the wheelspin state and the slip state in step S12, the electronic controller 62 proceeds to step S13. In a case where the wheel 14 is not in at least one of the wheelspin state and the slip state in step S17, the electronic controller 62 proceeds to step S18.

Figure 7:
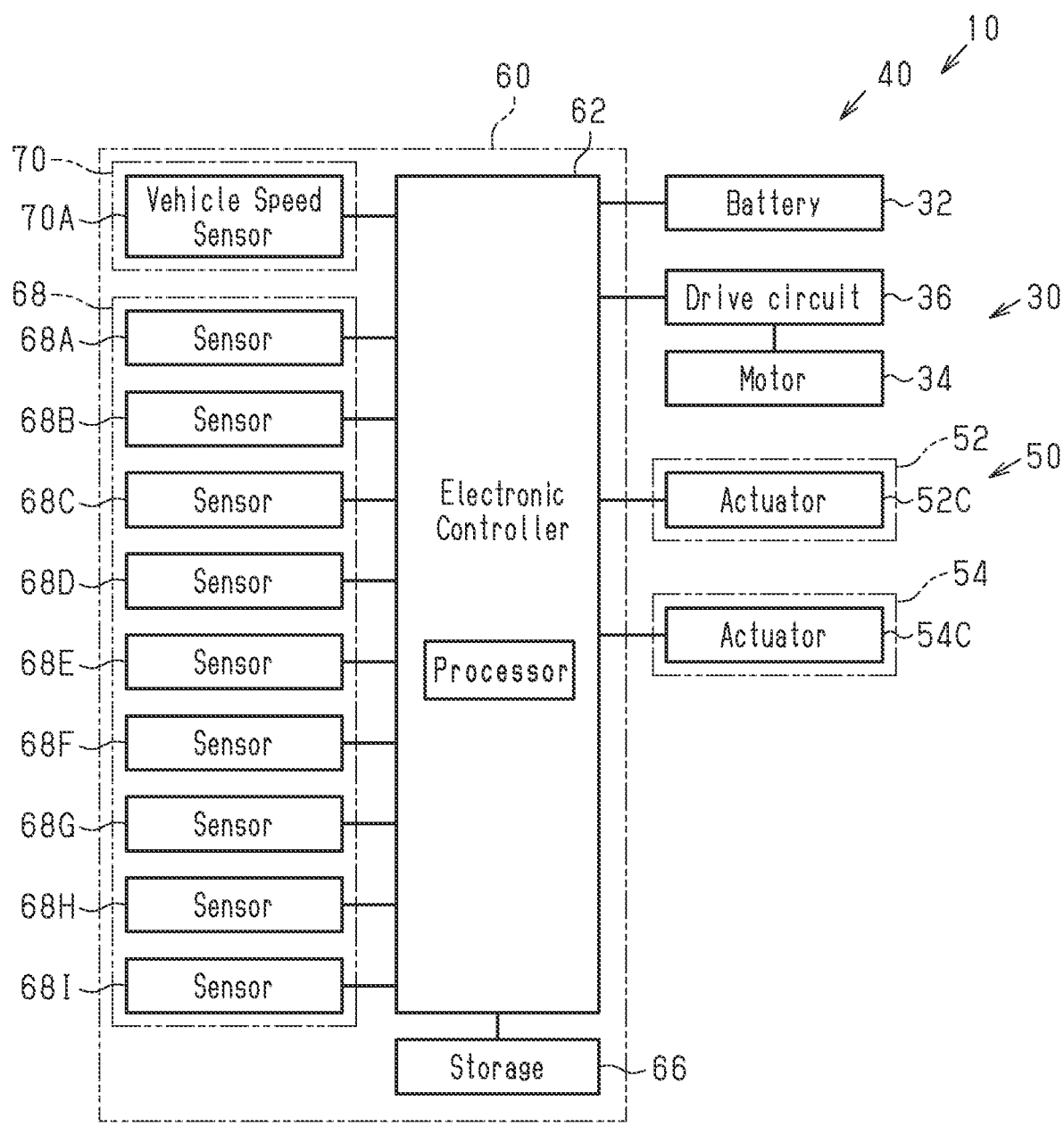
FIG. 7 is a block diagram showing an electrical configuration of a human-powered vehicle control device in accordance with a second modification.

The first detector 64 can be configured to detect the angular acceleration of the drive wheel 14C. For example, as shown in FIG. 7, the first detector 64 can be changed to a first detector 70. The first detector 70 includes a vehicle speed sensor 70A. The vehicle speed sensor 70A detects the rotational speed of the wheel 14. The vehicle speed sensor 70A is electrically connected to the electronic controller 62 through a wired connection or a wireless connection. The vehicle speed sensor 70A is attached to the swing arm 16A of the frame 16. The vehicle speed sensor 70A is connected to the electronic controller 62 and configured to communicate with the electronic controller 62 through a wired connection or a wireless connection. The vehicle speed sensor 70A outputs a signal in response to a change in a relative position between the magnet attached to the rear wheel 14B and the vehicle speed sensor 70A to the electronic controller 62. The electronic controller 62 calculates a vehicle speed of the human-powered vehicle 10 based on the rotational speed of the wheel 14. It is preferable that the vehicle speed sensor 70A include a magnetic reed forming a reed switch or a Hall element. The electronic controller 62 is configured to determine that the wheel 14 is in a wheelspin state or a slip state in response to the detection result of the first detector 70. Specifically, in a case where the first detector 70 detects that the angular acceleration W is larger than or equal to a fifth predetermined value WC, the electronic controller 62 is configured to determine that the wheel 14 is in the wheelspin state. In a case where the first detector 70 detects that the angular acceleration W larger than or equal to the fifth predetermined value WC and detects that the decrease amount per unit time of the human driving force is larger than or equal to a second predetermined value DH, it is further preferable that the electronic controller 62 be configured to determine that the wheel 14 is in the wheelspin state. The fifth predetermined value WC is set to correspond to the angular acceleration W of the wheel 14 in a case where the wheel 14 is in the wheelspin state. In a case where the first detector 70 detects that the angular acceleration W is smaller than a sixth predetermined value WD, the electronic controller 62 is configured to determine that the wheel 14 is in the slip state. In a case where the first detector 70 detects that the angular acceleration W is smaller than or equal to a seventh predetermined value WE and the first detector 70 detects that the human driving force is larger than or equal to a fourth predetermined value HA, it is further preferable that the electronic controller 62 be configured to determine that the wheel 14 is in the slip state.

Figure 8:
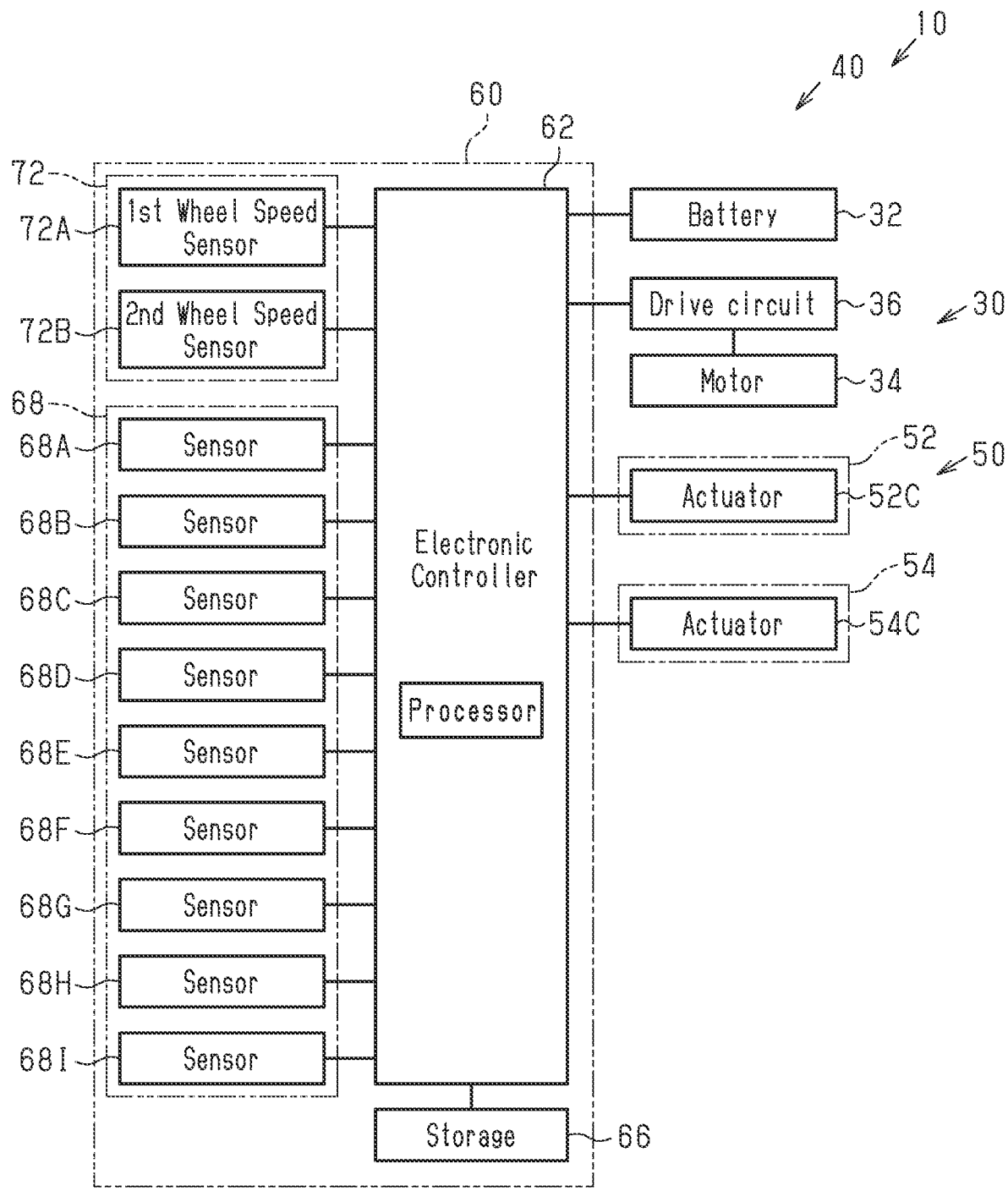
FIG. 8 is a block diagram showing an electrical configuration of a human-powered vehicle control device in accordance with a third modification.

The first detector 64 can be configured to detect a difference between an angular velocity of the drive wheel 14C and an angular velocity of the driven wheel 14D. For example, as shown in FIG. 8, the first detector 64 can be replaced by a first detector 72. The first detector 72 includes a first wheel speed sensor 72A and a second wheel speed sensor 72B. The first wheel speed sensor 72A detects the angular velocity of the drive wheel 14C. The first wheel speed sensor 72A has the same construction as the vehicle speed sensor 70A in FIG. 7. The second wheel speed sensor 72B has the same construction as the first wheel speed sensor 72A, is attached to the front fork 27, and detects the rotational speed of the driven wheel 14D. The electronic controller 62 is configured to determine that the wheel 14 is in the wheelspin state or the slip state in response to the detection result of the first detector 72. Specifically, in a case where the difference between the angular velocity of the drive wheel 14C and the angular velocity of the driven wheel 14D is larger than or equal to an eighth predetermined value and the angular velocity of the drive wheel 14C is higher, it is preferable that the electronic controller 62 be configured to determine that the wheel 14 is in the slip state. In a case where the difference between the angular velocity of the drive wheel 14C and the angular velocity of the driven wheel 14D is larger than or equal to a ninth predetermined value and the angular velocity of the driven wheel 14D is higher, it is preferable that the electronic controller 62 be configured to determine that the wheel 14 is in the slip state.

In the modification shown in FIG. 8, the first wheel speed sensor 72A can be replaced by a crank rotation sensor 64A. In this case, the electronic controller 62 can be configured to estimate the angular velocity of the drive wheel 14C by multiplying a transmission ratio of the human-powered vehicle 10 by the rotational speed of the crank 12A.

The unlocked state of the first suspension 52 further includes a first unlocked state and a second unlocked state where a first portion 52A and a second portion 52B easily move relative to each other than the first unlocked state. For example, in a case where the first suspension 52 uses a fluid, a width of a fluid flow path is changed to change the first unlocked state and the second unlocked state. In addition, in a case where the first suspension 52 uses a magnetic fluid, a magnetic field is changed to change the first unlocked state and the second unlocked state. In this case, in a case where the wheel 14 is in a wheelspin state or a slip state and the first suspension 52 is in the locked state, the electronic controller 62 changes the first suspension 52 to one of the first unlocked state and the second unlocked state. The electronic controller 62 can change the first suspension 52 to the second unlocked state in a case where the wheel 14 is in a wheelspin state or a slip state and in the first unlocked state.

The unlocked state of the second suspension 54 further includes a first unlocked state and a second unlocked state where a first portion 54A and a second portion 54B easily move relative to each other than the first unlocked state. For example, in a case where the second suspension 54 uses a fluid, a width of a fluid flow path is changed to change the first unlocked state and the second unlocked state. In addition, in a case where the second suspension 54 uses a magnetic fluid, a magnetic field is changed to change the first unlocked state and the second unlocked state. In this case, in a case where the wheel 14 is in a wheelspin state or a slip state and the second suspension 54 is in the locked state, the electronic controller 62 changes the second suspension 54 to one of the first unlocked state and the second unlocked state. The electronic controller 62 can change the first suspension 52 to the second unlocked state in a case where the wheel 14 is in a wheelspin state or a slip state and in the first unlocked state.

In a case where the posture of the rider of the human-powered vehicle 10 corresponds to a non-seated posture, the electronic controller 62 can further control the suspension device 50 if the load of the rider has a tendency to being shifted toward the front or rear of the human-powered vehicle 10. For example, in a case where a wheelspin state or a slip state of the wheel 14 is detected, the electronic controller 62 changes the second suspension 54 to the unlocked state in a case where the posture of the rider of the human-powered vehicle 10 corresponds to a non-seated posture and the forward bias is small. For example, in a case where the load of the handlebar 28 detected by the sensor 68F is larger than or equal to the first value and smaller than the second value, the electronic controller 62 determines that the posture of the rider of the human-powered vehicle 10 is in the non-seated state and the tendency of load being shifted toward the front is small. In a case where the load of the handlebar 28 is larger than or equal to the second value, the electronic controller 62 determines that the posture of the rider of the human-powered vehicle 10 corresponds to the non-seated state and the tendency of load being shifted toward the front is large. For example, in an image detected by the sensor 68G, if the posture of the rider of the human-powered vehicle 10 corresponds to the non-seated state and tilted toward the front, the electronic controller 62 determines that the posture of the rider of the human-powered vehicle 10 is in the non-seated state and the tendency of load being shifted toward the front is large. If the posture of the rider of the human-powered vehicle 10 corresponds to the non-seated state and not tilted toward the front, the electronic controller 62 determines that the tendency of load being shifted toward the front is small.

The electronic controller 62 can change the first suspension 52 to the unlocked state irrespective of the posture of the rider of the human-powered vehicle 10 in a case where a wheelspin state or a slip state of the wheel 14 is detected. In a case where a wheelspin state or a slip state of the wheels 14 is detected, the electronic controller 62 can change the second suspension 54 to the unlocked state or not change the operation state. In this modification, the second detector 68 can be omitted from the control device 60.

The electronic controller 62 can change the second suspension 54 to the unlocked state in a case where the wheel 14 is in a wheelspin state or a slip state and the rider of the human-powered vehicle 10 is in a non-seated state.

The electronic controller 62 can be configured to change only the operation state of one of the first suspension 52 and the second suspension 54 in response to the detection result of the first detector 64.

One of the first suspension 52 and the second suspension 54 can be omitted from the suspension device 50. In this case, the electronic controller 62 can be configured to change only the operation state of the other one of the first suspension 52 and the second suspension 54 in response to the detection result of the first detector 64.

The electronic controller 62 can lower the output of the motor 34 or stop the driving of the motor 34 in a case where the wheel 14 is in a wheelspin state or a slip state and the motor 34 of the auxiliary driving device 30 is driven. In addition, in a case where the wheel 14 is in a wheelspin state or a slip state, the electronic controller 62 can be configured to perform regenerative braking on the motor 34 of the auxiliary driving device 30.

What is claimed is:

1. A control system for a human-powered vehicle, the control system comprising:
    a suspension device including a first suspension and a second suspension;
    at least one detector configured to detect information related to at least two conditions of the human-powered vehicle, the conditions including an operating state of the suspension device, a power input to the human-powered vehicle, a torque of a power transmission component, and a rotating state of the power transmission component; and
    an electronic controller configured to selectively control the suspension device between a first operating state and a second operating state in accordance with a detection result obtained by the at least one detector.

2. The control system according to claim 1, wherein
    the at least one detector is connected to a wireless communicator configured to wirelessly receive detection result from a first detector of the at least one detector, the wireless communicator is provided to at least one of the first suspension, the second suspension and the detector.

3. The control system according to claim 2, wherein
    the at least one detector is provided to a component other than the suspension device.

4. The control system according to claim 1, wherein
    the at least one detector is configured to detect information related to the power input, the at least one detector including at least one of a crank rotation sensor, a torque sensor and a power meter.

5. The control system according to claim 1, wherein
    the at least one detector is configured to detect information related to a strain of a power transmission, the at least one detector including at least one of a strain sensor and a pressure sensor.

6. The control system according to claim 1, wherein
    the at least one detector is configured to detect information related to the rotating state of the power transmission, the at least one detector including at least one of crank rotation sensor and a torque sensor.

7. The control system according to claim 1, wherein
    the electronic controller is configured to change the first operating state into the second operating state of at least one of the first suspension and the second suspension in response to the detection result.

8. The control system according to claim 7, wherein
    the electronic controller is configured to control at least one of the first suspension and the second suspension to change from one of an unlocked state and a locked state when in the first operating state, into another one of the unlocked state and the locked state when in the second operating state.

9. The control system according to claim 8, wherein
    the electronic controller is configured to control at least one of the first suspension and the second suspension to change the operating state of one of the first suspension and the second suspension, and to not change the another one of the first suspension and the second suspension in accordance to the detection result.

10. The control system according to claim 1, wherein
    the electronic controller includes a memory configured to store at least one of the operating state and the detection result.

11. The control system according to claim 1, wherein
    the electronic controller and an actuator are disposed in a housing.

12. The control system according to claim 1, further comprising
    an auxiliary driving device configured to assist propulsion of the human-powered vehicle, the auxiliary driving device being connected to the electronic controller.

13. The control system according to claim 12, wherein
    the auxiliary driving device includes a motor, the electronic controller is configured to control the motor between at least one of lowering output, stop driving and perform regenerative braking in accordance to the detection result.

* * * * *